United States Patent
Andoralov et al.

(10) Patent No.: US 10,068,713 B2
(45) Date of Patent: Sep. 4, 2018

(54) HYBRID CAPACITOR AND METHOD OF MANUFACTURING A CAPACITOR

(71) Applicant: Kemet Electronics Corporation, Simpsonville, SC (US)

(72) Inventors: Victor Andoralov, Gränna (SE); Ralf Deisenhofer, Landsberg am Lech (DE)

(73) Assignee: KEMET Electronics Corporation, Simpsonville, SC (US)

( * ) Notice: Subject to any disclaimer, the term of this patent is extended or adjusted under 35 U.S.C. 154(b) by 26 days.

(21) Appl. No.: 15/095,902

(22) Filed: Apr. 11, 2016

(65) Prior Publication Data

US 2017/0294273 A1    Oct. 12, 2017

(51) Int. Cl.
| | |
|---|---|
| H01G 9/025 | (2006.01) |
| H01G 9/02 | (2006.01) |
| H01G 9/15 | (2006.01) |
| H01G 11/04 | (2013.01) |
| H01G 11/24 | (2013.01) |
| H01G 11/30 | (2013.01) |
| H01G 11/52 | (2013.01) |
| H01G 11/86 | (2013.01) |
| H01G 9/00 | (2006.01) |
| H01G 9/008 | (2006.01) |
| H01G 9/028 | (2006.01) |

(52) U.S. Cl.
CPC ............ *H01G 11/04* (2013.01); *H01G 9/008* (2013.01); *H01G 9/0036* (2013.01); *H01G 9/151* (2013.01); *H01G 11/24* (2013.01); *H01G 11/30* (2013.01); *H01G 11/52* (2013.01); *H01G 11/86* (2013.01); *H01G 9/028* (2013.01)

(58) Field of Classification Search
CPC ........... H01G 9/15; H01G 9/151; H01G 9/00; H01G 9/02; H01G 9/008
See application file for complete search history.

(56) References Cited

U.S. PATENT DOCUMENTS

| | | | |
|---|---|---|---|
| 4,203,877 A | 5/1980 | Baker | |
| 4,812,951 A | 3/1989 | Melody et al. | |
| 6,307,735 B1* | 10/2001 | Saito | H01G 9/025 361/512 |
| 8,462,484 B2 | 6/2013 | Kakuma et al. | |
| 8,767,377 B2 | 7/2014 | Aoyama et al. | |
| 2010/0020472 A1* | 1/2010 | Fujimoto | H01G 9/0036 361/511 |
| 2011/0128675 A1* | 6/2011 | Merker | H01G 9/0036 361/523 |
| 2013/0059064 A1 | 3/2013 | Majima et al. | |
| 2014/0071589 A1* | 3/2014 | Lin | H01G 9/012 361/523 |

FOREIGN PATENT DOCUMENTS

JP          07283086 A  * 10/1995    ............. H01G 11/52

* cited by examiner

*Primary Examiner* — Eric Thomas
(74) *Attorney, Agent, or Firm* — Joseph T. Guy; Patent Filing Specialist, Inc.

(57) ABSTRACT

An improved capacitor is described herein. The capacitor comprises a working element wherein the working element comprises an anode comprising a dielectric thereon and an anode conductive polymer layer on the dielectric. The capacitor also includes a cathode comprising a cathode conductive polymer layer and a conductive separator between the anode and said cathode. An anode lead is in electrical contact with the anode and a cathode lead is in electrical contact with the cathode.

40 Claims, 7 Drawing Sheets

HYBRID CAPACITOR AND METHOD OF MANUFACTURING A CAPACITOR

BACKGROUND

Figure 1:
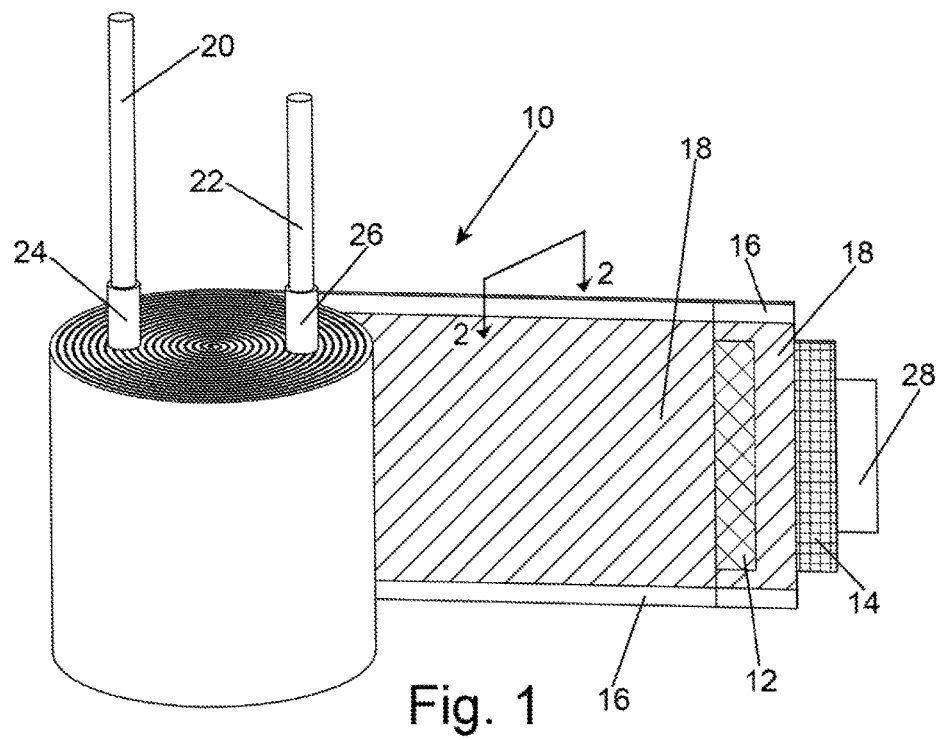

The present invention is related to capacitors comprising a solid conductive polymeric electrolyte and an optional liquid electrolyte. More specifically, the present invention is related to a capacitor comprising a conductive separator and a method of forming the hybrid capacitor with improved conductive polymer coverage within the interstitial portions of a wound structure.

Capacitors have historically been defined within two general types with one type utilizing a liquid electrolyte and the other type utilizing a solid electrolyte. Liquid electrolyte capacitors, generally, comprise a layered structure typically as a winding with an anode conductor, a cathode conductor and an interleaved separator immersed in a liquid electrolyte all sealed within a container. Solid electrolyte capacitors, generally, include a conductive monolith or foil with a dielectric layer thereon and a solid cathode, such as conductive polymer or manganese dioxide, on the dielectric. Both general types of capacitor have experienced wide spread use in commerce and each has advantages, and disadvantages, not common to the other. For example, liquid electrolytic capacitors have a high capacitance but a poor Equivalent Series Resistance (ESR) due to poor conductivity of the electrolyte, typically not above about 0.015 S/cm, whereas conductive polymers have a high conductivity, up to 600 S/cm, and therefore capacitors utilizing conductive polymeric cathodes have a much lower ESR.

Conductive polymeric cathodes have seen wide spread use in commerce due, at least in part, to their low equivalent series resistance (ESR) and non-destructive failure mode. This has lead to a desire to form a hybrid capacitor wherein the conductive polymers commonly employed for solid electrolytic capacitors are utilized within the windings of a liquid electrolyte structure with the goal of achieving the high voltage common with liquid electrolyte capacitors while maintaining the lower ESR common with solid conductive polymeric electrolytes. U.S. Pat. Nos. 8,462,484 and 8,767,377 teach exemplary hybrid capacitors.

The formation of a hybrid capacitor has typically involved the formation of the interleaved wound structure; comprising anode, cathode and separator; followed by impregnation with the conductive polymer. The impregnation has been done by either in-situ polymerization of monomers, or by diffusion of pre-formed polymer slurry into the interstitial areas of the wound interleaved structure.

In-situ polymerization of a monomer in the presence of an oxidizer was used to manufacture a first generation of hybrid capacitors. In-situ polymerization is a complex method with many problems including contamination of the final product by monomer and oxidizer and the work environment conditions are complex leading to poor process reliability. These issues were mitigated by the use of water based dispersions, or slurries, of pre-formed conductive polymer to impregnate the interstitial spaces of the capacitor winding.

Impregnation of a winding with preformed conductive polymer involves dipping the working element into a solution comprising conductive polymer or adding the solution onto the working element wherein the conductive polymer migrates, or diffuses, into the interstitial spaces. Manufacturing stages are complicated due to limitations associated with the rate and efficiency of diffusion through the working element. Filtration of polymeric particles and counterions by the separator limits effective diffusion thereby limiting the length of the working element. As a result, only small capacitor sizes have been successfully achieved. Large capacitors have proven difficult to make. In fact, the maximum case size widely available commercially is about 10 mm in diameter and about 12.5 mm length with a maximum capacitance of about 22 $\rho$F (at rated voltage 63V) and the lowest ESR achieved is about 16 mil.

Due to manufacturing limitations, hybrid capacitors have been primarily radial capacitors as the manufacturing process is not suitable for small axial capacitors. With axial capacitors the bottom tab, or lead, will necessarily be dipped in the polymer precursor or polymer slurry thereby resulting in a polymer coated tab which causes problems with subsequent processing. Furthermore, it is virtually impossible to apply voltage across the capacitor, such as to form polymer in-situ or to heal damaged sites, since the bottom tab will be in the solution.

In spite of the ongoing efforts, those of skill in the art still do not have a suitable method for forming a hybrid capacitor, and a hybrid capacitor formed thereby, suitable for large case sizes or suitable for use in manufacturing axial capacitors. The present invention provides a method for making a hybrid capacitor which is not size dependent and which exhibits improved quality and reproducibility.

SUMMARY OF THE INVENTION

It is an object of the invention to provide an improved method for forming a hybrid capacitor and an improved capacitor formed by the improved method.

It is an object of the invention to provide a method for making an axial hybrid capacitor and an axial hybrid capacitor.

A particular feature of the invention is the ability to provide a hybrid capacitor without limit to capacitor size, configuration or shape.

These and other advantages, as will be realized, are provided in a capacitor. The capacitor comprises a working element wherein the working element comprises an anode comprising a dielectric thereon and an anode conductive polymer layer on the dielectric. The capacitor also includes a cathode comprising a cathode conductive polymer layer and a conductive separator between the anode and said cathode. An anode lead is in electrical contact with the anode and a cathode lead is in electrical contact with the cathode.

Yet another embodiment is provided in an axial wound capacitor comprising a working element wherein the working element comprises an anode comprising a dielectric thereon, a cathode; and a conductive separator between the anode and cathode. An anode lead is in electrical contact with the anode and a cathode lead is in electrical contact with the cathode.

Yet another embodiment is provided in a method for forming a capacitor. The method includes:
forming an anode layer comprising an anode, a dielectric on the anode and an anode conductive polymer on the dielectric;
forming a cathode layer comprising a cathode and a cathode conductive polymer on the cathode;
forming a conductive separator; and
forming a working element comprising winding said anode layer and said cathode layer with said conductive separator between said anode layer and said cathode layer wherein said working element has an anode lead in electrical contact with said anode and a cathode lead in electrical contact with said cathode.

Yet another embodiment is provided in a method for forming a capacitor. The method includes:
forming an anode layer;
forming a cathode layer;
forming a conductive separator comprising a conductive polymer coated on a material or impregnating the material; and
forming a working element comprising winding the anode layer and the cathode layer with the conductive separator between the anode layer and cathode layer wherein the working element has an anode lead in electrical contact with an anode of the anode layer and a cathode lead in electrical contact with a cathode of the cathode layer.

FIGURES

Figure 2:
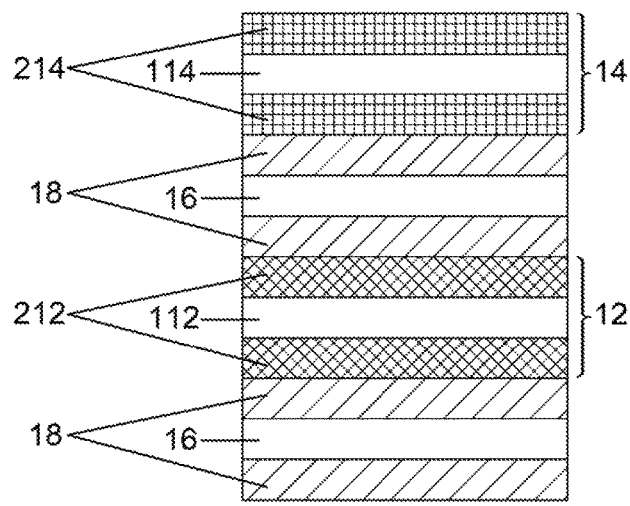
Figure 3:
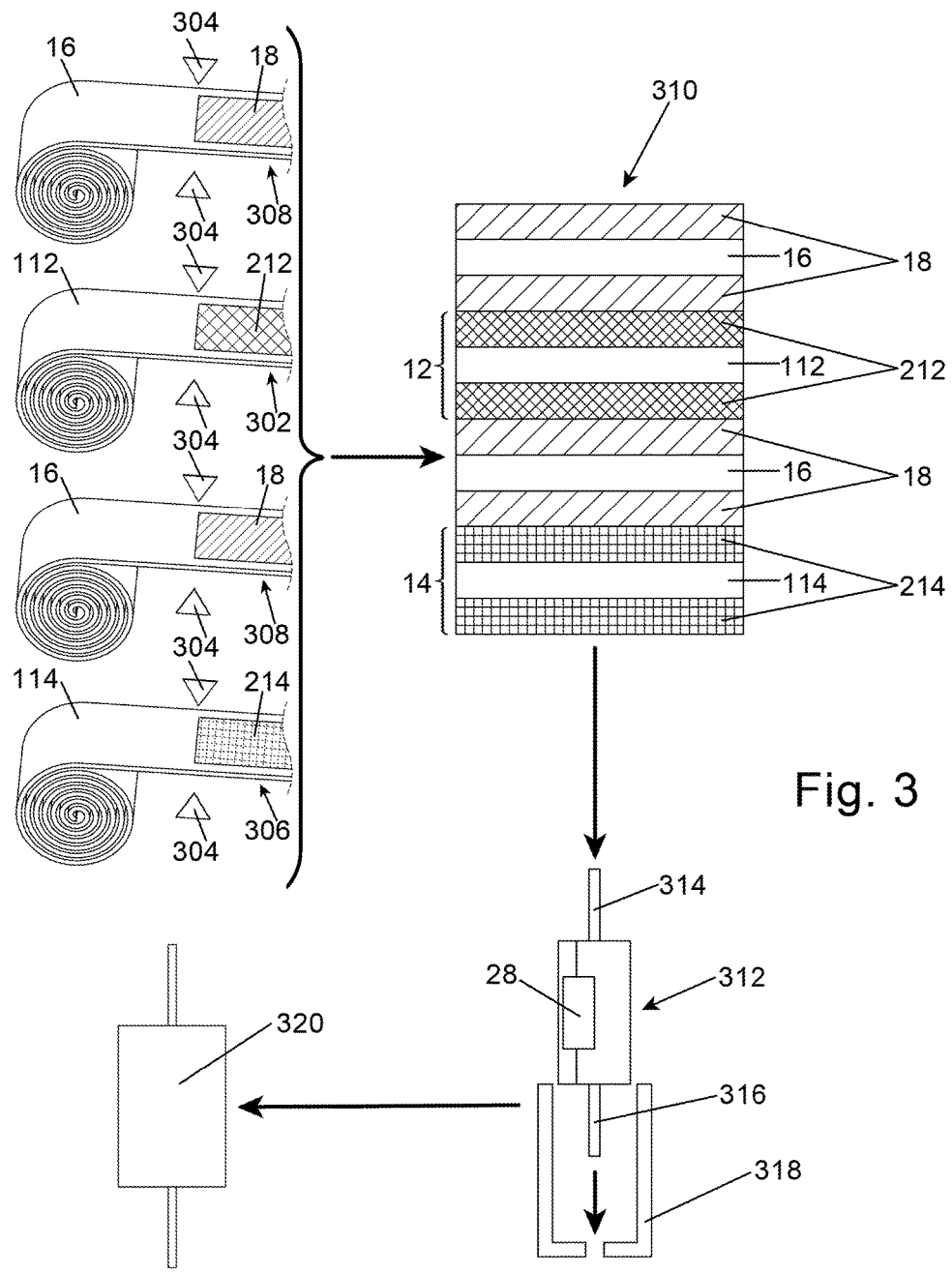
Figure 4:
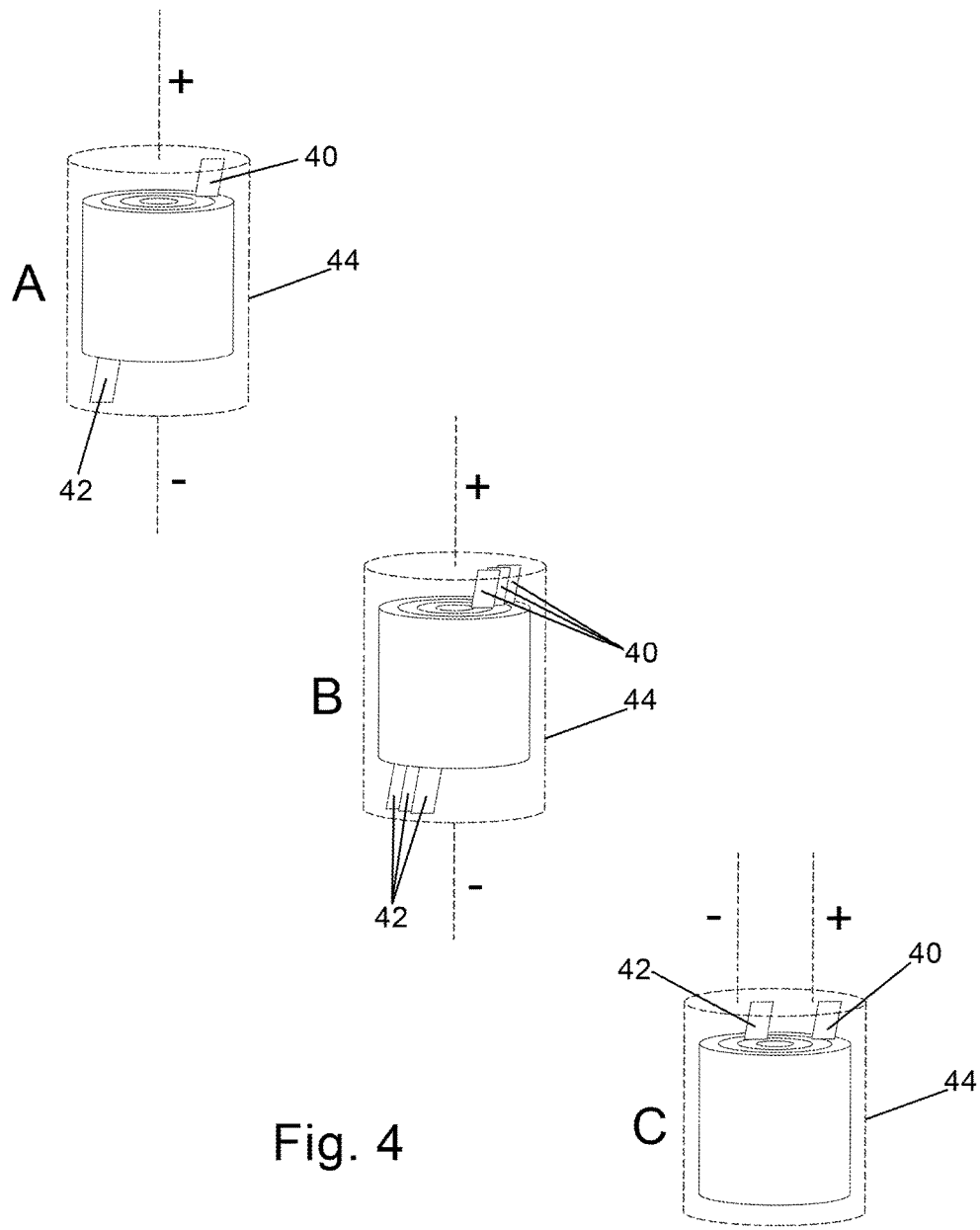
Figure 5:
Figure 9:
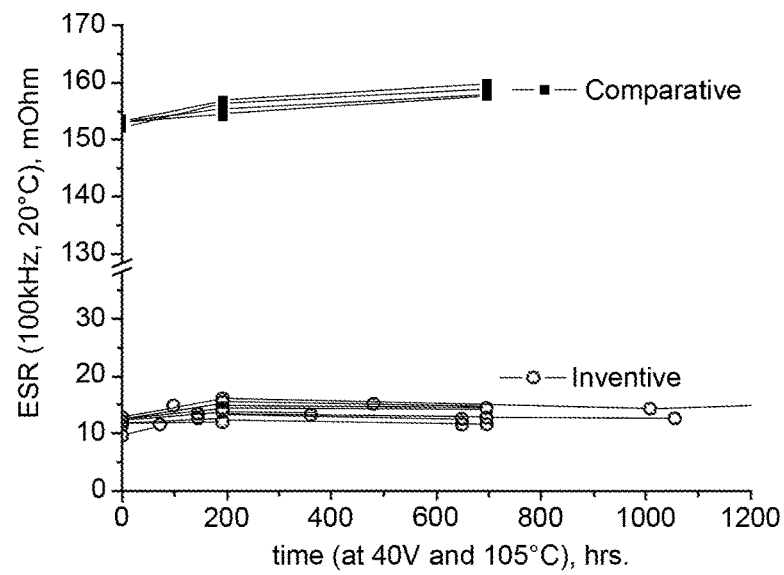
Figure 10:
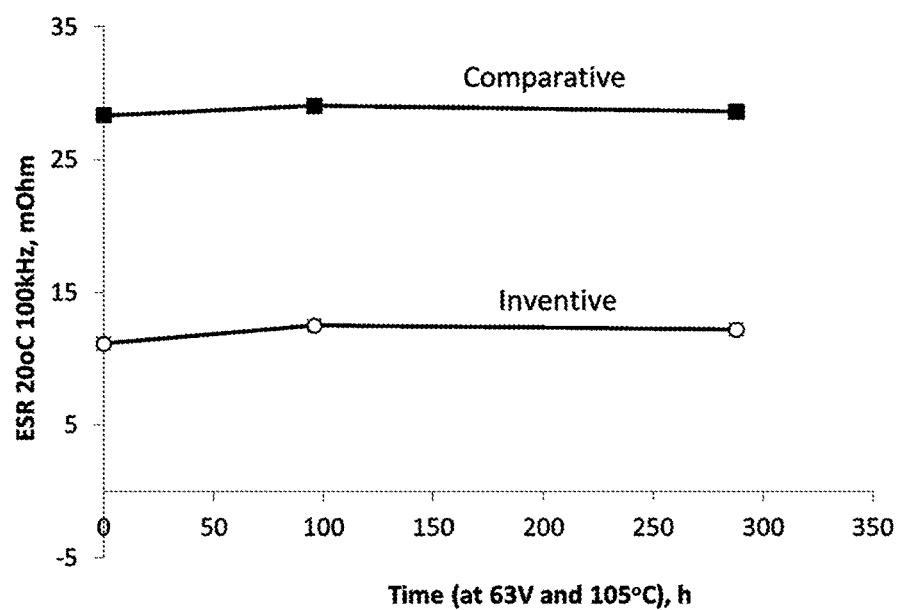
Figure 11:
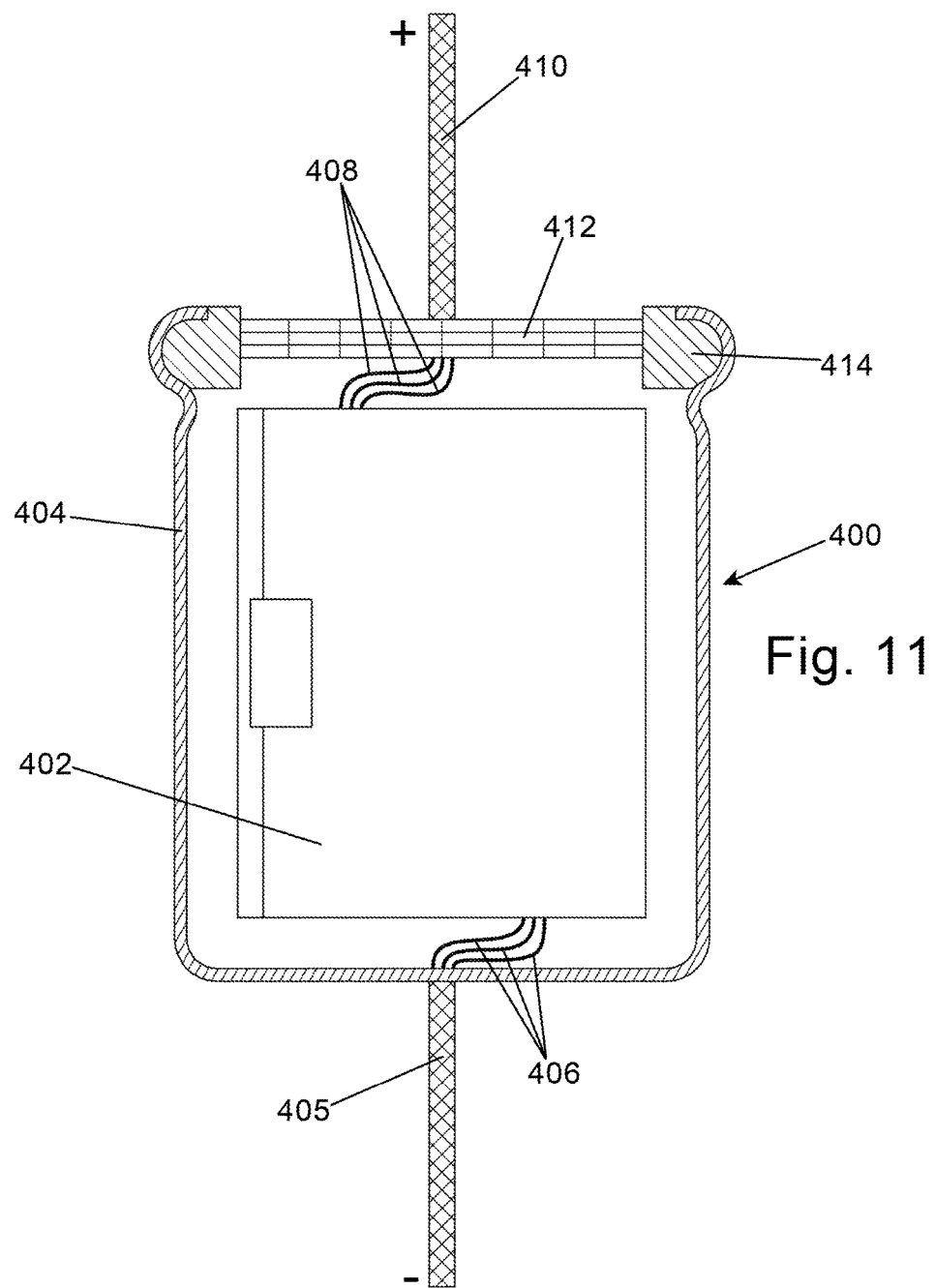

FIG. 1 is a partially unwound schematic perspective view of an embodiment of the invention.
FIG. 2 is a cross-sectional view taken along line 2-2 of FIG. 1.
FIG. 3 is a schematic representation of an embodiment of the invention.
FIG. 4 is a schematic representation of an embodiment of the invention.
FIG. 5 is a schematic representation illustrating an advantage of the invention.
FIGS. 6-10 are graphical representations illustrating advantages of the invention.
FIG. 11 is a cross-sectional schematic view of an embodiment of the invention.

DESCRIPTION

The instant invention is specific to a capacitor, comprising a solid conductive polymer electrolyte and an optional liquid electrolyte interspersed in a wound capacitor comprising interleaved anode, cathode and separator. More specifically, the present invention is directed to a capacitor, and a method of making a capacitor, which is not limited in size, exhibits improved quality and is suitable for manufacturing axial capacitors. More specifically, the instant invention allows for the manufacture of capacitors with enhanced performance, specifically low ESR and high capacitance, without limit to case size and in virtually any design including axial, radial, planar, etc.

An element of the instant invention is the utilization of anodes, cathodes and separators which are pre-treated with conductive polymer either as a coating or, particularly in the case the separator, being impregnated with conductive polymer. The pre-treatment with conductive polymer is done before the working element is formed thereby allowing for an improved polymer layer relative to the prior art. Since the method is not limited to polymer diffusion into the windings the instant method eliminates capacitor size restrictions and significantly increases volumetric efficiency defined as capacitance as a function of capacitor size.

The problem associated with solid electrolyte distribution over the entire electrode surface is eliminated by the formation of a conductive porous layer prior to winding thereby providing a conductor between the anode conductive polymer coating and cathode conductive polymer coating whereby conventional liquid electrolyte can flow through the conductive porous layer to provide typical functions thereof such as self-healing. As the conductive polymeric layers are formed prior to winding the only impregnation necessary after winding is the liquid electrolyte which is more mobile and can more easily diffuse, or migrate, into the interstitial area. This allows for a wide variety of designs since the liquid electrolyte is not impeded from migrating into even the most remote interstitial spaces. Furthermore, the prior problem of conductivity break, essentially an incomplete electrical conductive pathway, between polymer coated electrodes common with the art is mitigated by substituting the typical non-conductive separator with a conductive porous layer between the anode conductive polymer coating and cathode conductive polymer coating.

The invention will be described with reference to the various figures forming an integral non-limiting component of the disclosure. Throughout the disclosure similar elements will be numbered accordingly.

An embodiment of the invention will be described with reference to FIG. 1 wherein a working element is shown in schematic partial unwound view prior to insertion into a container and impregnation with liquid electrolyte. In FIG. 1, the working element, generally represented at 10, comprises a conductive coated anode, 12, and conductive coated cathode, 14, with a conductive separator, 16, there between. The conductive separator has conductive polymer, 18, either coated on the separator or the separator is impregnated, and preferably saturated, with conductive polymer. The conductive coated anode, 12, and conductive coated cathode, 14, each have conductive polymer layers there on as will be more full described herein. An anode lead, 20, and cathode lead, 22, extend from the wound capacitor and ultimately form the electrical connectivity to a circuit. It would be understood from the description that the anode lead is in electrical contact with the anode and the cathode lead is in electrical contact with the cathode and electrically isolated from the anode or anode lead. Tabs, 24 and 26, are commonly employed to electrically connect the anode lead to the anode and the cathode lead to the cathode as known in the art. A closure, 28, such as an adhesive tape inhibits the working element from unwinding during handling and assembly after which the closure has little duty even though it is part of the finished capacitor.

A cross-sectional view, taken along line 2-2 of FIG. 1, is illustrated schematically in FIG. 2. In FIG. 2, the separator, 16, is shown with conductive polymer, 18, on either side thereof for the purposes of illustration with the understanding that the separator may be impregnated, and preferably saturated, with conductive polymer such that the dimension of the separator is not appreciably altered by the inclusion of conductive polymer. The conductive coated anode, 12, comprises an anode foil, 112, with an anode conductive polymer layer, 212, on either side thereof. The conductive coated cathode, 14, comprises a cathode foil, 114, with a cathode conductive polymer layer, 214, on either side thereof. The separator is preferably porous thereby allowing liquid electrolyte to pass there through. Once the working element is formed and inserted into a housing liquid electrolyte fills any void or vacancy between the anode conductive polymer layer, 212, and the cathode conductive polymer layer, 214. The separator is preferably porous with liquid electrolyte moving freely through the separator.

The adjacent conductive polymer layers are, in one embodiment, in physical contact but not otherwise fused, cross-linked, or laminated to each other. Disassembly would result in a clean separation of adjacent layers of conductive polymer. In an alternative embodiment adjacent conductive polymer layers are intimate represented by being fused, cross-linked, or laminated to each other thereby mimicking at continuous conductive polymer layer. Disassembly would result in dissociation of the conductive polymer layer from one side or the other and conductive polymer layer destruction.

An embodiment of the invention will be described with reference to FIG. 3. In FIG. 3, a series of layers are prepared including an anode layer, at 302, wherein an anode foil, 112, is treated to form a dielectric on the surface of the anode foil and then a conductive polymer layer, 212, is formed on the dielectric by a conductive polymer application process, 304. The conductive polymer application process occurs on both sides of the anode foil, on the dielectric, in simultaneous or sequential coating steps. A cathode layer is formed, at 306, wherein a conductive polymer layer, 214, is formed on the cathode, 114, by a conductive polymer application process, 304, which may be the same process as used for the anode conductive polymer layer or a different process. A separator layer is formed, at 306, wherein an impregnated area of conductive polymer, 18, is formed by a conductive polymer application process, 304, which may be the same process as the anode and cathode layer formation or a different process. The conductive polymer is formed as a layer on the cathode and anode and may be a layer or an impregnated material for the separator. A layered structure, 310, as described relative to FIG. 2, is formed by interleaving the layers. The layered structure is slit, an anode tab, 314, is electrically connected to the anode and a cathode tab, 316, is electrically connected to the cathode resulting in a tabbed working element, 312, preferably with a closure, 28, securing the working element to inhibit unwinding. Leads, not shown, are preferably attached to the tab, or the tab functions as a lead, or electrically connects to a component of a housing such as a conductive, preferably metallic, can or conductive, preferably metallic, lid which functions as a lead, thereby providing a leaded working element. For the purposes of this illustration an axial arrangement is illustrated without limit thereto. The leaded working element is placed in a housing, 318, thereby forming a housed leaded working element. The housed leaded working element is optionally impregnated with working electrolyte, the housing is sealed and the capacitor is aged to provide a finished capacitor, 320.

The cathode foil, separator and anode foil are typically provided as a wide roll and slit to size. The anode foil is preferably etched and a dielectric is formed thereon. The dielectric may be formed prior to slitting in which case a subsequent step is desirable to form dielectric on the slit edge prior to application of the conductive polymer coating. The cathode, separator and anode may be treated with a coupling agent, to improve adhesion between the surface and conductive polymer layer, or to impart other specific surface behaviors. The cathode, separator and anode may be washed and dried before or after conductive polymer layer formation or impregnation and the conductive polymer layer formation or impregnation step may be repeated several times if required. Electrical leads, or tabs, are typically electrically connected to the anode and cathode, preferably prior to cutting to length and the leads may be treated with masking material to protect them from farther modification and to keep them ready for welding to capacitor terminals.

The conductive polymer may be applied to the cathode, anode or separator by any suitable method including immersion, coating, and spraying. In immersion the cathode, anode or separator is pulled through a bath or vessel with a conductive polymer dispersion therein wherein the dispersion comprises at least about 1 wt % conductive polymer to no more than about 10 wt % conductive polymer. Immersion is preferred for the separator. Coating and spraying may be done with any printing technique including screen printing or spraying of a dispersion of conductive polymer dispersion onto the surface of cathode foil, anode foil, or separator. Coating or spraying is preferable for the cathode and anode. It is preferable that the conductive polymer coating be applied to the anode, cathode or separator at an amount of at least 0.1 mg/cm$^2$. Below about 0.1 mg/cm$^2$ the coating weight is insufficient for adequate conduction and incomplete coating may result. It is preferable that the conductive polymer coating be applied an amount to achieve a coating weight of no more than about 10 mg/cm$^2$. Above about 10 mg/cm$^2$ the added coating thickness does not appreciably increase the conductivity.

An axial capacitor is a particularly preferred embodiment. An axial capacitor has an anode terminal on one face of the capacitor and a cathode terminal on the opposite face. Wound axial capacitors, incorporating conductive polymer electrolytes, have been considered unavailable due to the issues related with polymer impregnation wherein the lower tab or lead is necessarily immersed in the conductive polymer, or precursors, leading to detrimental deposition of conductive polymer thereon. A particular advantage with axial capacitors is the ability to utilize multiple tabs and leads particularly as the length of the anode and cathode increase as is now available with the instant invention. Longer foil lengths lead to a higher percentage of foil resistance culminating in a higher ESR. Multi-tab or multi-leads minimizes the foil resistance effect. With a single lead the current must flow from the furthest extent of the foil to the tab and lead which is detrimental to ESR. It is preferable to utilize multiple anode leads and multiple cathode leads thereby decreasing the conductive path length. Various capacitor configurations will be described with reference to FIG. 4 wherein the capacitors are illustrated schematically in partial shadow view thereby allowing the components to be visualized. In FIG. 4, a single tab axial capacitor is illustrated at A, a multiple tab axial capacitor is illustrated at B and a radial capacitor is illustrated at C. An axial capacitor has anode leads, 40, and cathode leads, 42, extending from opposing sides of the working element, 44, whereas a radial capacitor has anode leads and cathode leads extending from a common side. FIG. 4B illustrates multiple anode tabs, 40, and multiple cathode tabs, 42, extending from the working element wherein each tab is in electrical contact with the anode at a different location. For example, FIG. 4B is illustrated with three tabs, without limit thereto, wherein the tabs are preferably equally spaced along the length of the anode thereby minimizing the length of the conduction path. Similarly, FIG. 4B is illustrated with three cathode leads which are preferably equally spaced along the length of the cathode. Multiple leads are possible with radial capacitors but it has previously been unsuitable for use with hybrid capacitors since the limitation of a small size made the use of multiple leads on a common face difficult to manufacture. Even with a large size single leads are preferable with radial capacitors.

An axial capacitor is illustrated in cross-sectional schematic view in FIG. 11. In FIG. 11, the capacitor, generally represented at 400, comprises a working element, 402, as described herein, within a housing, 404. The housing, which may be referred to as a can in the art, is preferably conductive and may function as a lead or be in electrical contact with a lower lead, 405, which is preferably the cathode lead. Lower tabs, 406, which are preferably cathode tabs, are in electrical contact with the housing or lower lead. Upper tabs, 408, which are preferably anode tabs, are in electrical contact with an upper lead, 410, which is preferably an anode lead or the upper tabs are in electrical contact with a conductive lid, 412, which is then in electrical contact with the upper lead. A seal, 414, such as a gasket seals the housing to inhibit atmospheric exchange between the interior of the housing and ambient atmosphere. In one embodiment the seal is a hermetic seal.

The anode is a conductive metal preferably in the form of a foil. The conductive metal is preferably a valve metal or a conductive oxide of the valve metal. Particularly preferred anodes comprise a valve metal such as tantalum, aluminum, niobium, titanium, zirconium, hafnium, alloys of these elements, or a conductive oxide thereof such as NbO. Aluminum is a particularly preferred anode material.

An oxide film is formed on the anode as the dielectric. The dielectric may be formed using any suitable electrolyte solution, referred to as a forming electrolyte, such as a phosphoric acid or a phosphate-containing solution. A formation voltage of from about 9 V to about 450 V is commonly applied. The formation voltage typically ranges from 2.0 to 3.5 times the rated voltage of the capacitor.

The conductive polymer application process is generally selected from in-situ polymer formation and application of a preformed polymer from a slurry such as by a coating process. For the in-situ process impregnating solutions are applied to the surface wherein the impregnating solutions preferably contain monomer, oxidizing agent, dopant and other adjuvants as known to those of skill in the art. The selection of a suitable solvent for the solution is well within the level of skill in the art. Examples of suitable solvents include ketones and alcohols such as acetone, pyridine, tetrahydrofuran, methanol, ethanol, 2-propanol, and 1-butanol. The monomer concentration may be from about 1.5 wt. % to about 20 wt. %, more preferably from about 5 wt. % to about 15 wt. % for demonstration of the invention. Suitable monomers for preparing conductive polymers include but are not limited to aniline, pyrrole, thiophene, and derivatives thereof. A preferred monomer is 3,4-ethylenedioxythiophene. The oxidizing agent concentration may be from about 6 wt. % to about 45 wt. % and more preferably from about 16 wt. % to about 42 wt. % for demonstration of the invention. Oxidizing agents for preparing conductive polymers include Fe(III) salts of organic and inorganic acids, alkali metal persulfates, ammonium persulfate, and others. A preferred oxidant for demonstration of the invention is Fe(III) tosylate. The dopant concentration may be from about 5 wt. % to about 30 wt. % and more preferably from about 12 wt. % to about 25 wt. %. Any suitable dopant may be used, such as dodecyl benzenesulfonate, p-tosylate, or chloride. The preferred dopant is p-tosylate. The pellets are cured at a temperature of from 65° C. to about 160° C. and more preferably from about 80° C. to about 120° C. thereby allowing the monomer to polymerize. After curing, the polymer layer is preferably washed in deionized water or another solvent.

Application of a preformed polymer from a slurry is a preferred method. The polymer can be prepared as a slurry or obtained commercially as a slurry and applied to the surface, without particular limit to the technique, preferably followed by drying. A slurry of polymerized 3,4-ethylenedioxythiophene with a particle size of at least 1 nm to no more than 200 nm, more preferably at least 20 nm to no more than 200 nm, in a solvent is exemplary for demonstration of the invention. For application to the separator it is preferable that the slurry be allowed to impregnate the separator sufficiently prior to drying. It is preferable that a continuous coating of conductive polymer be applied to maximize the surface area of conductivity. In a particularly preferred embodiment at least 80% of the surface area of the anode and at least 80% of the surface area of the cathode is coated with conductive polymer. More preferably, at least 90% of the surface area of the anode and at least 90% of the surface area of the cathode is coated with conductive polymer and most preferably at least 99% of the surface area of the anode and at least 99% of the surface area of the cathode is coated with conductive polymer.

The liquid electrolyte is a solvent preferably with a supporting salt therein. Any conventional solvent can be used with exemplary solvents including γ-butyrolactone, sulfolane, ethylene carbonate, propylene carbonate, dimethyl carbonate, ethyl methyl carbonate, acetonitrile, propionitrile, dimethyl formamide, diethyl formamide, water, silicone oil, polyethylene glycol and mixtures thereof. Though not required a supporting salt is preferred. Exemplary supporting salts include inorganic acid ammonium salts, inorganic acid amine salts, inorganic acid alkyl substituted amide salts, organic ammonium salts, organic acid amide salts, organic acid alkyl substituted amide salts and derivatives thereof. Any gas absorbents or cathode electrochemical depolarizers can be used. Exemplary supported additives include nitro derivatives of organic alcohols, acids, esters, aromatic derivatives such as o-, m-, p-nitroanisole, o-,m-,p-nitrobenzoic acid, o-,m-,p-nitrobenzene alcohol. A particularly hybrid capacitor comprises up to 50 wt % liquid electrolyte.

The spacer is not particularly limited herein and any commercially available separator can be used to demonstrate the invention with the proviso that it is a material which can either be coated with, or impregnated with, a conductive polymer. Alternatively, or in addition to the conductive polymer, the spacer may itself be a conductive material. Exemplary spacers function as a skeleton layer for the conductive polymer. The spacer can be fabricated in the form of a sheet of different dimensions which can be wound in rolls, reels etc. or the spacer can be in the form of a paste or gel. The anode foil can function as a support for the spacer wherein the anode foil has an insulator layer formed on the surface thereof with a conductive polymer coating on the insulator and with a conductive spacer layer formed on the polymer coating. The use of the anode as a support may minimize operating difficulty. The spacer is a porous conductive layer which allows direct electrical contact between the anode conductive polymer layer and a cathode. Preferably, the spacer has a volume of pores for liquid electrolyte to transit through. Paper or other non-conductive materials, such as polymers, can be used as support for the conductive polymer. Paper is an exemplary spacer due to the widespread use and availability. Unlike prior art capacitors the paper does not need to be charred. In the manufacture of prior art capacitors the paper is often charred after formation of the working element to minimize the amount of polymer absorbed into the paper. With the present invention this is unnecessary since the spacer is either coated with conductive polymer or impregnated with conductive polymer. The spacer may be a fibrous material, such as paper fiber, either physically intermingled or cross-linked to form a continual fibrous, such as paper fiber, layer. The space between the fibers might be partly or fully filled with the high conductivity component. Paper based spacers can be manufactured by modification of a finished paper layer or by modification of paper with high conductivity component fibers before forming of paper layer, a dispersion of conductive fibers, pieces, particles or their agglomerates in a liquid or solid state or a deposition of conductive fibers, pieces, particles. The conductive fibers, pieces or particles may comprise a conductive material such as conductive polymer, carbon black, graphite, metal etc., or can be a composite material consisting of a non-conductive core such as paper, plastic etc., modified with a conductive material such as conductive polymer, carbon black, graphite, metal etc.

A particularly preferred spacer has a width which is suitable for the working element length or production process with a width of 1.5 cm to 500 cm being exemplary for demonstration of the invention. The length is chosen based on the desired capacitance as capacitance is a function of anode and cathode overlap and is therefore directly related to length and width of the cathode and anode. A spacer with a length of for 0.1 m to 400 m and thickness of 10 μm up to 300 μm is exemplary for demonstration of the invention.

The conductive polymer is preferably selected from polyaniline, polypyrrole and polythiophene or substitutional derivatives thereof.

A particularly preferred conducting polymer is represented by Formula I:

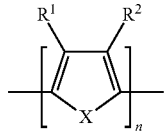

FORMULA 1 wherein $R^1$ and $R^2$ are chosen to prohibit polymerization at the β-site of the ring. It is most preferred that only α-site polymerization be allowed to proceed. Therefore, it is preferred that $R^1$ and $R^2$ are not hydrogen. More preferably, $R^1$ and $R^2$ are α-directors. Therefore, ether linkages are preferable over alkyl linkages. It is most preferred that the groups be small to avoid steric interferences. For these reasons $R^1$ and $R^2$ taken together as —O—(CH$_2$)$_2$—O— is most preferred. In Formula 1, X is S or N and most preferable X is S. A particularly preferred conductive polymer is polymerized 3,4-polyethylene dioxythiophene (PEDOT).

$R^1$ and $R^2$ independently represent linear or branched C1-C16 alkyl or C2-C18 alkoxyalkyl; or are C3-C8 cycloalkyl, phenyl or benzyl which are unsubstituted or substituted by C1-C6 alkyl, C1-C6 alkoxy, halogen or OR3; or R1 and R2, taken together, are linear C1-C6 alkylene which is unsubstituted or substituted by C1-C6 alkyl, C1-C6 alkoxy, halogen, C3-C8 cycloalkyl, phenyl, benzyl, C1-C4 alkylphenyl, C1-C4 alkoxyphenyl, halophenyl, C1-C4 alkylbenzyl, C1-C4 alkoxybenzyl or halobenzyl, 5-, 6-, or 7-membered heterocyclic structure containing two oxygen elements. R3 preferably represents hydrogen, linear or branched C1-C16 alkyl or C2-C18 alkoxyalkyl; or are C3-C8 cycloalkyl, phenyl or benzyl which are unsubstituted or substituted by C1-C6 alkyl.

As typically employed in the art, various dopants can be incorporated into the polymer during the polymerization process. Dopants can be derived from various acids or salts, including aromatic sulfonic acids, aromatic polysulfonic acids, organic sulfonic acids with hydroxy group, organic sulfonic acids with carboxylhydroxyl group, alicyclic sulfonic acids and benzoquinone sulfonic acids, benzene disulfonic acid, sulfosalicylic acid, sulfoisophthalic acid, camphorsulfonic acid, benzoquinone sulfonic acid, dodecylbenzenesulfonic acid, toluenesulfonic acid. Other suitable dopants include sulfoquinone, anthracenemonosulfonic acid, substituted naphthalenemonosulfonic acid, substituted benzenesulfonic acid or heterocyclic sulfonic acids as exemplified in U.S. Pat. No. 6,381,121 which is included herein by reference thereto.

Binders and cross-linkers can be also incorporated into the conductive polymer layer if desired. Suitable materials include poly(vinyl acetate), polycarbonate, poly(vinyl butyrate), polyacrylates, polymethacrylates, polystyrene, polyacrylonitrile, poly(vinyl chloride), polybutadiene, polyisoprene, polyethers, polyesters, silicones, and pyrrole/acrylate, vinylacetate/acrylate and ethylene/vinyl acetate copolymers.

Other adjuvants, coatings, and related elements can be incorporated into a capacitor, as known in the art, without diverting from the present invention. Mentioned, as a non-limiting summary include, protective layers, multiple capacitive levels, terminals, leads, etc.

A particular feature of the invention is the ability to provide a capacitor with a high voltage. By utilizing the conductive separator a capacitor with a rated voltage capability of 15 V to 250 V can be obtained. Furthermore, the capacitors can be made larger such as a diameter of 10 mm to 30 mm and larger with lengths of 15 mm to 50 mm or larger.

Comparative Study

The deficiencies of the prior art hybrid capacitors can be realized by observing the components in a commercially available product such as a capacitor with a working element having a diameter of about 10 mm and length of about 8 mm. The impact of the filtration process is visually indicated as unevenly coated foil and separator with a concentration of conductive polymer located around the last turn of the winding and in the bottom of the winding. In exemplary cases less than 40% of the foil is coated with conductive polymer indicating at least 60% of the foil is ineffective at fully contributing to the capacitance. FIG. 5 provides a schematic representation of the differences between the prior art and the instant invention wherein only the outer extent of the prior art anode, represented by A, is coated with the central portion lacking any conductive polymer coating whereas, for the inventive example, represented by B, the entire surface is coated with conductive polymer.

Inventive Example 1 (I-1)

Anodized aluminum anode foils and aluminum cathode foils of sizes and capacitance rating as shown in Table 1 were heat treated at 300±5° C. for 30±5 min. The anode foil was subjected to a first edge formation treatment by immersing in 5% oxalic acid at 30±5° C. at a voltage of 5 mA/cm$^2$. The foil was washed for a minimum of 5 minutes and dried at 125±5° C. for 25-30 min. The anode foil was heat treated at 300±5° C. for 30±5 min followed by a second edge formation in 1% ammonium citrate at a voltage of 1.5 mA/cm$^2$ at 50±5° C. followed by washing for at least 5 min and drying at 125±5° C. for 25-30 min. The anode and cathode were subjected to a silane treatment for 15-30 sec. in a solution comprising 4935 ml+/−50 ml DI Water, 15 ml+/−0.5 ml acetic acid and 50 ml+/−1 ml 3-glycidoxypropyltrimethoxysilane at a pH of 3.0+/−1.0. The anode and cathode foils were again heat treated 300±5° C. for 30±5 min. The anode was anodized again to oxidize the edges in 0.1% ammonium phosphate at a voltage of 1.5 mA/cm$^2$ at 55±5° C. followed by washing for at least 5 minutes and drying at 125±5° C. for 25-30 minutes. The silane treatment was repeated for 15-30 seconds followed by air drying for 15-20 min. The silane was cured at 125+/−5° C. 15+/−3 minutes. The conductive polymer layer was applied by pulling the anode and cathode through a slurry comprising poly-3,4-ethylenedioxythiophene (PEDOT) and polystyrene sulfonate (PSS) at a speed of 3 mm/sec followed by drying initially at 80° C. for about 10 min then at 150° C. for about 10 minutes followed by allowing the coatings to cool down to room temperature. The polymer coating was repeated three times with drying between coats. The percentage of projective and real surface area covered with polymer was observed to be about 100% for all components including the cathode foil, anode foil, and separator. All components were observed to be flexible and suitable for winding as an axial capacitor without generating cracks. The components are stable during long term storage. The capacitors were tested and the results are presented in Table 1.

Inventive Example 2 (I-2)

Example 1 was repeated except for application of the polymer which was applied by spraying a slurry with the same observed coverage as in Inventive Example 1.

Comparative Example 1 (C-1)

Samples were made using same anodes and cathodes as Inventive Example 1 except that the conductive polymer was added by prior art methods as set forth in U.S. Pat. No. 8,767,377. The results are presented in Table 1.

TABLE 1

| Process | Size (Diameter × Length), mm | $V_R$, V | Capacitance, uF | CV, mF*V |
| --- | --- | --- | --- | --- |
| I-1 | D10 × L20 + Polymer | 40 | 116 | 4.64 |
| C-1 | D20 × L27 + Polymer | 40 | 570 | 22.8 |
| I-1 | D20 × L27 + Polymer | 40 | 1480 | 59.2 |
| C-1 | D20 × L27 + Polymer | 63 | 158 | 9.95 |
| I-1 | D20 × L27 + Polymer | 63 | 480 | 30.24 |

In Table 1, $V_R$ is rated voltage and CV is capacitance× volts. In the examples the capacitance, with the same size anode and cathode, was almost three times as high for the inventive example as for the comparative example.

Figure 6:
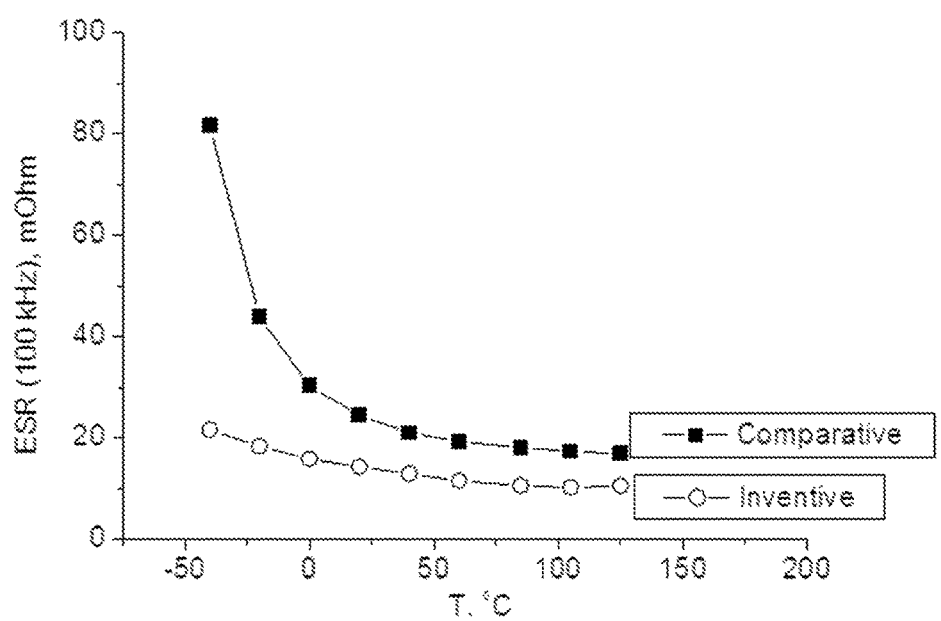
Figure 7:
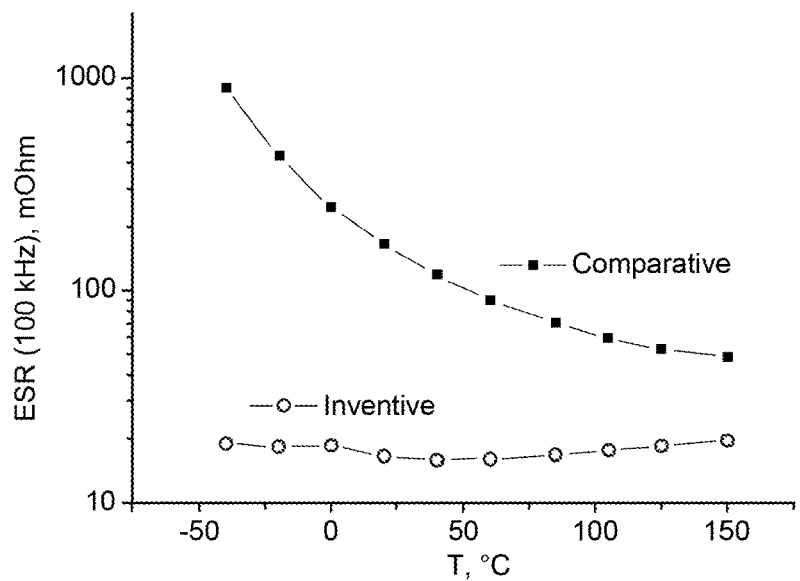
Figure 8:
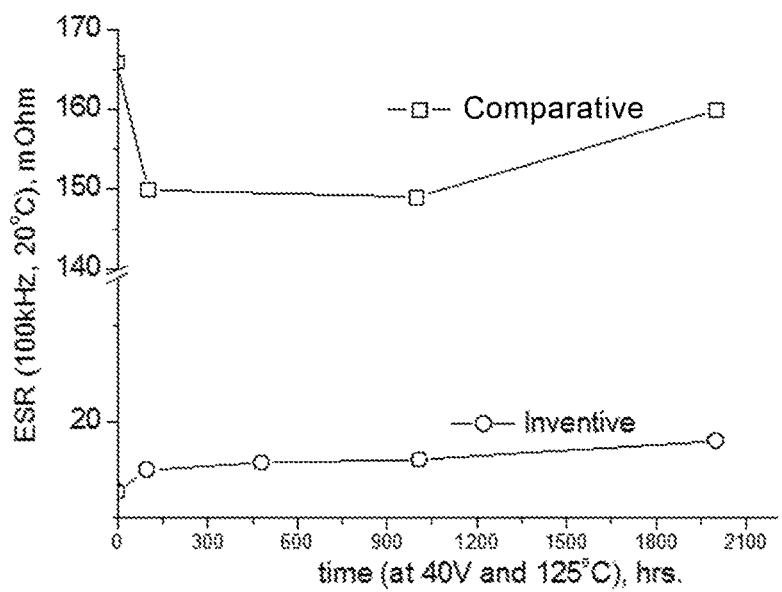

The results obtained for the inventive examples was successfully applied for manufacturing of axial capacitors of various case sizes. CV for 40-63V capacitors was approximately three times higher for the inventive examples than for the comparative examples. Life tests demonstrated that manufactured prototypes demonstrate high stability during several toughen hours at high temperature and rated voltages. Low ESR and suppressed temperature dependence were achieved for the prototypes at the same time with high CV values. FIGS. 6-10 illustrate the advantages of the invention. FIG. 6 illustrates the improvement in ESR as a function of temperature for an inventive axial capacitor with diameter of 20 mm and length of 27 mm with a rated voltage of 40 V. FIG. 7 illustrates the improvement in ESR as a function of temperature for an inventive axial capacitor with diameter of 10 mm and length of 20 mm with a rated voltage of 40 V. FIG. 8 illustrates the improvement in ESR as a function of time at 125° C. for an inventive axial capacitor with diameter of 10 mm and length of 20 mm with a rated voltage of 40 V. FIG. 9 illustrates improvements in ESR as a function of time at 105° C. for a series of prior art, comparative, hybrid 40 V capacitors versus a series of inventive capacitors and FIG. 10 illustrates improvements in ESR as a function of time at 105° C. for a comparative, hybrid 63 V capacitor versus an inventive capacitor.

The invention has been described with reference to the preferred embodiments without limit thereto. One of skill in the art would realize additional embodiments and improvements which are not specifically set forth herein but which are within the scope of the invention as more specifically set forth in the claims appended hereto.

The invention claimed is:

1. A capacitor comprising:
    a working element comprising:
        an anode comprising a dielectric thereon and an anode conductive polymer layer on said dielectric;
        a cathode comprising a cathode conductive polymer layer; and
        a conductive separator between said anode and said cathode wherein said conductive separator comprises a separator conductive polymer and a non-conductive support wherein said separator conductive polymer is in physical contact with said anode conductive polymer and said cathode conductive polymer;
    an anode lead in electrical contact with said anode;
    a cathode lead in electrical contact with said cathode; and
    a liquid electrolyte between said anode and said cathode.

2. The capacitor of claim 1 wherein said anode lead and said cathode lead are on different sides of said capacitor.

3. The capacitor of claim 2 wherein said anode lead and said cathode lead are on opposite sides of said capacitor.

4. The capacitor of claim 1 comprising up to 50 wt % of said liquid electrolyte.

5. The capacitor of claim 1 wherein said anode conductive polymer layer covers at least 80% of a surface area of said dielectric or said cathode conductive polymer layer covers at least 80% of a surface area of said cathode.

6. The capacitor of claim 5 wherein said anode conductive polymer layer covers at least 90% of said surface area of said dielectric or said cathode conductive polymer layer covers at least 90% of said surface area of said cathode.

7. The capacitor of claim 1 wherein said conductive separator comprises a conductive polymer.

8. The capacitor of claim 7 wherein said conductive separator comprises a material with said conductive polymer coated on said material or said conductive polymer impregnates said separator.

9. The capacitor of claim 7 wherein at least one of said conductive polymer, said cathode conductive polymer or said anode conductive polymer comprises a polymer selected from the group consisting of polyaniline, polythiophene and polypyrrole.

10. The capacitor of claim 9 wherein said conductive polymer is poly 3,4-ethylenedioxythiophene.

11. The capacitor of claim 1 comprising multiple anode leads or multiple cathode leads.

12. The capacitor of claim 1 wherein at least one of said anode or said cathode comprises a valve metal.

13. The capacitor of claim 12 wherein said valve metal is selected from the group consisting of tantalum, aluminum, niobium, titanium, zirconium, hafnium, alloys of these elements and a conductive oxide thereof.

14. The capacitor of claim 13 wherein said valve metal is aluminum.

15. The capacitor of claim 1 wherein at least one of said anode, said cathode or said separator has a conductive polymer coating of at least 0.1 mg/cm² to no more than 10 mg/cm².

16. The capacitor of claim 1 having a diameter of at least 10 mm to no more than 30 mm.

17. The capacitor of claim 1 having a length of at least 15 mm to no more than 50 mm.

18. The capacitor of claim 1 having a rated voltage of at least 15 volts to no more than 250 volts.

19. A method for forming a capacitor comprising:
forming an anode layer comprising an anode, a dielectric on said anode and an anode conductive polymer on said dielectric;
forming a cathode layer comprising a cathode and a cathode conductive polymer on said cathode;
forming a conductive separator comprising impregnating or coating a non-conductive separator with a conductive polymer;
forming a working element comprising winding said anode layer and said cathode layer with said conductive separator between said anode layer and said cathode layer to form a winding with said conductive separator in physical contact with said anode layer and said cathode layer wherein said working element has an anode lead in electrical contact with said anode and a cathode lead in electrical contact with said cathode; and
adding a liquid electrolyte to said working element wherein said liquid electrolyte is between said anode conductive polymer and said cathode conductive polymer.

20. The method for forming a capacitor of claim 19 comprising up to 50 wt % of said liquid electrolyte.

21. The method for forming a capacitor of claim 19 comprising forming a layer of said anode conductive polymer on said anode by applying a dispersion of said conductive polymer to said anode.

22. The method for forming a capacitor of claim 21 wherein said dispersion comprises at least 1 wt % to no more than 10 wt % of said conductive polymer.

23. The method for forming a capacitor of claim 19 comprising forming a layer of said cathode conductive polymer on said cathode by applying a dispersion of said conductive polymer to said cathode.

24. The method for forming a capacitor of claim 23 wherein said dispersion comprises at least 1 wt % to no more than 10 wt % of said conductive polymer.

25. The method for forming a capacitor of claim 19 wherein said anode lead and said cathode lead are on different sides of said capacitor.

26. The method for forming a capacitor of claim 25 wherein said anode lead and said cathode lead are on opposite sides of said capacitor.

27. The method for forming a capacitor of claim 19 wherein said anode conductive polymer layer covers at least 80% of a surface area of said dielectric or said cathode conductive polymer layer covers at least 80% of a surface area of said cathode.

28. The method for forming a capacitor of claim 27 wherein said anode conductive polymer layer covers at least 90% of said surface area of said dielectric or said cathode conductive polymer layer covers at least 90% of said surface area of said cathode.

29. The method for forming a capacitor of claim 19 wherein at least one of said dielectric or said cathode has a conductive polymer coating weight of at least 0.1 mg/cm$^2$ to no more than 10 mg/cm$^2$.

30. The method for forming a capacitor of claim 19 wherein said conductive separator comprises a material with said conductive polymer coated on said material or said material impregnates said separator.

31. The method for forming a capacitor of claim 30 wherein said separator has a conductive polymer coating weight of at least 0.1 mg/cm$^2$ to no more than 10 mg/cm$^2$.

32. The method for forming a capacitor of claim 30 wherein at least one of said conductive polymer, said cathode conductive polymer or said anode conductive polymer comprises a polymer selected from the group consisting of polyaniline, polythiophene and polypyrrole.

33. The method for forming a capacitor of claim 32 wherein said conductive polymer is poly 3,4-ethylenedioxythiophene.

34. The method for forming a capacitor of claim 19 comprising forming multiple anode leads or multiple cathode leads.

35. The method for forming a capacitor of claim 19 wherein at least one of said anode or said cathode comprises a valve metal.

36. The method for forming a capacitor of claim 35 wherein said valve metal is selected from the group consisting of tantalum, aluminum, niobium, titanium, zirconium, hafnium, alloys of these elements and a conductive oxide thereof.

37. The method for forming a capacitor of claim 36 wherein said valve metal is aluminum.

38. The method for forming a capacitor of claim 19 having a diameter of at least 10 mm to no more than 30 mm.

39. The method for forming a capacitor of claim 19 having a length of at least 15 mm to no more than 50 mm.

40. The method for forming a capacitor of claim 19 having a rated voltage of at least 15 volts to no more than 250 volts.

* * * * *